United States Patent
Yang et al.

(10) Patent No.: US 8,072,193 B2
(45) Date of Patent: Dec. 6, 2011

(54) PHASE SHIFT CONTROL METHOD FOR BOOST CONVERTER AND CIRCUIT IMPLEMENTATION

(75) Inventors: Xu Yang, Xian (CN); Yanping Yin, Xian (CN); Ming Xu, Blacksburg, VA (US); Yongjiang Bai, Xian (CN); Qiaoliang Chen, Xian (CN)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 449 days.

(21) Appl. No.: 12/356,880

(22) Filed: Jan. 21, 2009

(65) Prior Publication Data
US 2010/0181970 A1 Jul. 22, 2010

(51) Int. Cl.
*G05F 1/61* (2006.01)
*G05F 1/614* (2006.01)

(52) U.S. Cl. ......................................... 323/213; 323/272

(58) Field of Classification Search .......... 323/271–272, 323/282–284, 350, 212, 213; 363/24–26, 363/65, 72, 84, 89–90, 125, 127
See application file for complete search history.

(56) References Cited

U.S. PATENT DOCUMENTS

| | | | |
|---|---|---|---|
| 4,174,534 A * | 11/1979 | Kotlarewsky | 363/26 |
| 5,861,734 A * | 1/1999 | Fasullo et al. | 323/222 |
| 5,905,369 A * | 5/1999 | Ishii et al. | 323/272 |
| 6,091,233 A * | 7/2000 | Hwang et al. | 323/222 |
| 6,262,901 B1 * | 7/2001 | Simopoulos | 363/72 |
| 7,205,752 B2 * | 4/2007 | Jansen | 323/272 |
| 2007/0013353 A1 * | 1/2007 | Noma | 323/284 |
| 2009/0206805 A1 * | 8/2009 | Choi et al. | 323/271 |
| 2009/0206809 A1 * | 8/2009 | Koo et al. | 323/282 |

* cited by examiner

*Primary Examiner* — Gary L Laxton
*Assistant Examiner* — Nusrat Quddus
(74) *Attorney, Agent, or Firm* — Winston Hsu; Scott Margo

(57) ABSTRACT

A phase shift control method for a boost converter and circuit implementation comprises a master phase and at least one slave phase. A master-phase inductor current flowing through the master phase has a master-phase charge time interval and a master-phase discharge time interval; a slave-phase inductor current flowing through the slave phase has a slave-phase charge time interval and a slave-phase discharge time interval. The method comprises: calculating an ideal switching timing whereat the slave-phase inductor current descends to a zero-current judgment value; obtaining a physical switching timing whereat the slave-phase charge time interval starts; calculating a conduction timing error between the physical switching timing and the ideal switching timing; determining the time length of the slave-phase charge time interval in the same cycle according to the conduction timing error and the master-phase charge time interval.

8 Claims, 6 Drawing Sheets

| k | $k_1 < 0$ | $k_2 = 0$ | $k_3 = \dfrac{T_{on}}{T_{on}+T_{off}}$ | $k_4 = \dfrac{2T_{on}}{T_{on}+T_{off}}$ | $k_5 > \dfrac{2T_{on}}{T_{on}+T_{off}}$ |
|---|---|---|---|---|---|
| $\dfrac{\Delta T_{on}'}{\Delta T_{on}}$ | $< -1$ | $= -1$ | $= 0$ | $= 1$ | $> 1$ |

PHASE SHIFT CONTROL METHOD FOR BOOST CONVERTER AND CIRCUIT IMPLEMENTATION

FIELD OF THE INVENTION

The present invention relates to a phase shift control method for a boost converter and circuit implementation, whereby a paralleled boost converter is driven to reliably work in a critical current conduction mode.

BACKGROUND OF THE INVENTION

At present, the switch-type converters are used in most power supply to regulate voltage, and the boost converter is the most frequently used type among them. The boost converter is also used in power factor correction circuits and boosts the voltage to regulate the power factor of the input power. Refer to FIG. 1 a diagram schematically showing the basic architecture of a paralleled boost converter. Firstly, a rectifier unit 1 receives an input power via an input terminal 101 and rectifies the input power into a DC power. The boost converter 2 modulates the DC power into a modulated power and outputs the modulated power to a power conversion unit 3. The power conversion unit 3 converts the modulated power into the power that the power supply intends to output. The abovementioned boost converter 2 is a paralleled-type converter and comprises a master phase and a slave phase. The master phase includes a master inductor 21 connected to a diode 26, and a controllable first switch 23 is connected to between the master inductor 21 and the diode 26. The slave phase includes a slave inductor 22 connected to a diode 27, and a controllable second switch 24 is connected to between the slave inductor 22 and the diode 27. The boost converter 2 also has a control unit 25 generates a first driving signal and a second driving signal respectively driving the first switch 23 and the second switch 24. The conduction and disconnection of the first switch 23 divide the curve of the master-phase inductor current $I_{master}$, which flows through the master inductor 21 into a current-increasing master-phase charge time interval and a current-decreasing master-phase discharge time interval. Similarly, the conduction and disconnection of the second switch 24 divide the curve of the slave-phase inductor current $I_{slave}$, which flows through the slave inductor 22 into a current-increasing slave-phase charge time interval and a current-decreasing slave-phase discharge time interval. The control unit 25 respectively outputs the first driving signal and the second driving signal at different timings. Thus are separated the timings of the conduction states of the first switch 23 and the second switch 24.

The abovementioned driving method is referred to as the interleaved control method, and the abovementioned converter is thus referred to as the interleaved paralleled boost converter. The interleaved control method is further divided into the phase shift conduction method and the phase shift disconnection method. Refer to FIG. 2 for the control pulse timing and the current waveforms of the phase shift conduction method. FIG. 2 shows the waveform of the master-phase inductor current $I_{master}$ flowing through the master inductor 21 and the waveform of the slave-phase inductor current $I_{slave}$ flowing through the slave inductor 22. The directions of the master-phase inductor current $I_{master}$ and the slave-phase inductor current $I_{slave}$ have been shown in FIG. 1. Before discussing the current waveforms, we have to define "timing" and "time interval" firstly. "Timing" is defined to be the time point of the transition of the high level and the low level of a driving signal. Thus, "timing" is the time point whereat the first switch 23 or the second switch 24 begins conduction or disconnection herein. "Time interval" is defined to be the duration of a state. Thus, "time interval" is the duration of the conduction state or the disconnection state of the first switch 23 or the second switch 24 herein. The phase shift conduction method is characterized in that when the master inductor 21 outputs a zero current, the first driving signal is charged until a time interval $T_{ON}$ has elapsed, and that the timing of the conduction state of the second driving signal has a time lag with respect to the timing of the conduction state of the first driving signal. Suppose that $T_S$ is the time interval of charging the first driving signal, and that $T_S/2$ is the time lag between the timing of the conduction state of the second driving signal and the timing of the conduction state of the first driving signal. Thus, the control unit 25 will output the second driving signal after the first driving signal has been output for $T_S/2$. The problem of the phase shift conduction method is that the timings of the conduction states of the first and second driving signals have a fixed time lag. The control unit 25 outputs the second driving signal not according to the current state of the slave inductor 22 but according to the fixed time lag plus the timing of outputting the first driving signal. Thus, the second driving signal has output when there is still current in the slave inductor 22, or the second driving signal has not output yet even though the current of the slave inductor 22 has stopped for a period of time. In such a case, the slave inductor 22 does not work in an expected critical current conduction mode but works in a continuous current conduction mode or a discontinuous current conduction mode.

Refer to FIG. 3 for the driving signals and the currents waveforms of the phase shift disconnection method. FIG. 3 shows the waveform of the master-phase inductor current $I_{master}$ flowing through the master inductor 21 and the waveform of the slave-phase inductor current $I_{slave}$ flowing through the slave inductor 22. In the phase shift disconnection method, the timing of outputting the first driving signal is similar to that in the phase shift conduction method, but the control unit 25 uses the time point whereat the slave inductor 22 has a zero current output as the timing of outputting the second driving signal. The timing of interrupting the second driving signal is a time lag plus the timing of interrupting the first driving signal. The phase shift disconnection method can guarantee that the boost converter works in the critical current conduction mode. However, the conduction state of the slave phase is not controlled directly but dependent on whether the slave phase has a zero current. Refer to FIG. 4. When the load causes the current variation of the master-phase inductor current, or when the input power variation fluctuates, there is a conduction timing error $\Delta T$ between the physical disconnection state and the ideal disconnection state, which causes the sub-harmonic oscillation of the current output by the boost converter 2. According to theoretical deduction and experimental data, the sub-harmonic oscillation will occur when the duty ratio of the second switch 24 is less than 0.5. As shown in FIG. 4, the slave-phase inductor current increases or decreases abruptly. Sometimes, the slave-phase inductor current may fluctuate so disorderly that even the converter cannot operate any more.

Since it is hard to control the phase shift conduction method to work in the critical current conduction mode, we have to overcome the sub-harmonic oscillation of the phase shift disconnection method to improve the performance of the paralleled boost converter.

SUMMARY OF THE INVENTION

Considering the phase shift disconnection method has the problem of the sub-harmonic oscillation causing the power runaway of the slave loop when applying to the interleaved paralleled boost converter, one objective of the present invention is to provide a control method to drive the interleaved paralleled boost converter, whereby the master phase can operate normally, and whereby the working timing of the slave phase is corrected to avoid the power runaway caused by the conduction timing error ΔT.

The present invention proposes a phase shift control method for a boost converter and circuit implementation. The boost converter comprises a master phase and at least one slave phase paralleled coupled to the master phase. A master-phase inductor current flowing through the master phase has a master-phase charge time interval and a master-phase discharge time interval; a slave-phase inductor current flowing through the slave phase has a slave-phase charge time interval and a slave-phase discharge time interval. The method of the present invention comprises: (a) starting the master-phase charge time interval to increase the master-phase inductor current when the master-phase inductor current is determined to have reached a zero-current judgment value; (b) starting the master-phase discharge time interval when the master-phase charge time interval is completed; finishing the master-phase discharge time interval to complete a current cycle and starting the next master-phase charge time interval when the master-phase inductor current is determined to have reached the zero-current judgment value; (c) calculating an ideal switching timing whereat the slave-phase inductor current descends to the zero-current judgment value according to a peak value of the slave-phase inductor current in the preceding cycle, and obtaining a physical switching timing in a time point whereat the slave-phase inductor current descends to the zero-current judgment value, and then calculating a conduction timing error between the physical switching timing and the ideal switching timing; (d) determining the time length of the slave-phase charge time interval in the same cycle according to a function of the conduction timing error and the master-phase charge time interval. Thereby, the present invention uses the conduction timing error to calculate the slave-phase charge time interval to adjust the switching timing of the slave-phase discharge time interval, whereby the conduction timing error will not increase in the next cycle, and the sub-harmonic oscillation will not occur in the slave-phase inductor current.

BRIEF DESCRIPTION OF THE DRAWINGS

FIG. 8 is a table showing the relationship of the error constant and the slave-phase inductor current according to the present invention.

DETAILED DESCRIPTION OF THE PREFERRED EMBODIMENTS

Figure 5:
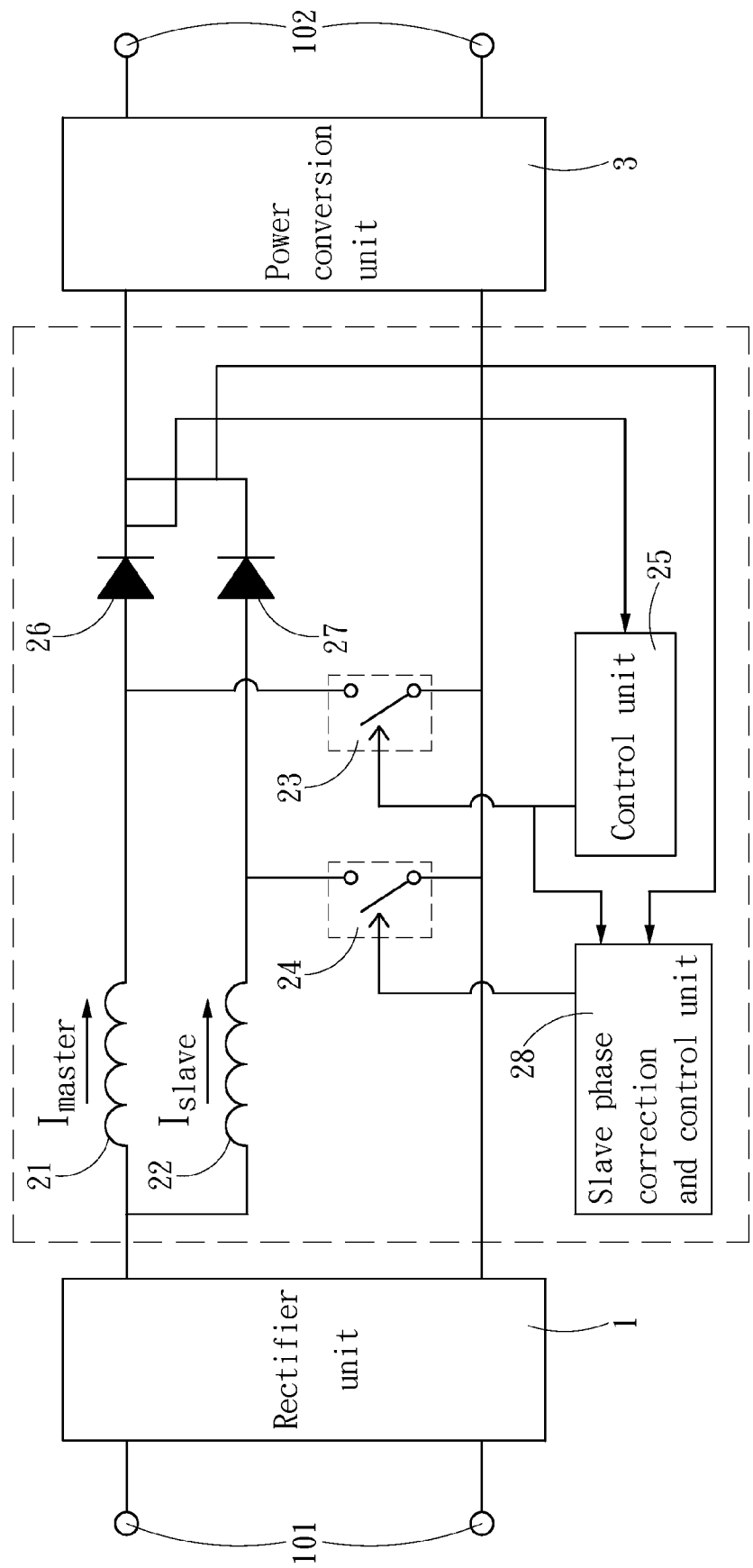
FIG. 5 is a diagram schematically showing the architecture of a circuit realizing a phase shift control method according to the present invention.

The present invention proposes a phase shift control method for a boost converter and circuit implementation. Refer to FIG. 5. The present invention applies to an interleaved paralleled boost converter (referred to as the boost converter 2 thereinafter) of a power supply. In the power supply, a rectifier unit 1 receives an input power via an input terminal 101 and rectifies the input power into a DC power. The booster converter 2 modulates the DC power into a modulated power and outputs the modulated power to a power conversion unit 3. The power conversion unit 3 converts the modulated power into the rated power and then outputs the rated power to the output terminal 102. The boost converter 2 comprises a master phase and at least one slave phase paralleled coupled to the master phase. The master phase has an inductor 21 and a diode 26 cascaded to the inductor 21; a first switch 23 is connected to between the inductor 21 and the diode 26. The slave phase has an inductor 22 and a diode 27 cascaded to the inductor 22; a second switch 24 is connected to between the inductor 22 and the diode 27. The conduction and disconnection of the first switch 23 divide the curve of a master-phase inductor current $I_{master}$, which flows through the master phase into a master-phase charge time interval and a master-phase discharge time interval. The conduction and disconnection of the second switch 24 divide the curve of a slave-phase inductor current $I_{slave}$, which flows through the slave phase into a slave-phase charge time interval and a slave-phase discharge time interval. The control method of the present invention comprises the following steps: (a) starting the master-phase charge time interval to increase the master-phase inductor current when the master-phase inductor current is determined to have reached a zero-current judgment value; (b) starting the master-phase discharge time interval when the master-phase charge time interval is completed; finishing the master-phase discharge time interval to complete a current cycle and starting the next master-phase charge time interval when the master-phase inductor current is determined to have reached the zero-current judgment value; (c) calculating an ideal switching timing whereat the slave-phase inductor current descends to zero-current judgment value according to the peak value of the slave-phase inductor current in the preceding cycle, and obtaining the physical switching timing in a time point whereat the slave-phase inductor current descends to the zero-current judgment value and the slave-phase charge time interval starts, and then calculating the conduction timing error $\Delta T_{on}$ between the physical switching timing and the ideal switching timing; (d) determining the time length of the slave-phase charge time interval in the same cycle according to a function of the conduction timing error $\Delta T_{on}$ and the master-phase charge time interval, wherein the slave-phase charge time interval is equal to the conduction timing error $\Delta T_{on}$ multiplied by an error constant plus the master-phase charge time interval, and wherein the master-phase charge time interval is a fixed length of time. To realize the control method described above, the boost converter further comprises a control unit 25 generating a first driving signal to trigger the first switch 23, and a slave phase correction and control unit 28 generating a second driving signal to trigger the second switch 24. The control unit 25 and the slave phase correction and control unit 28 respectively control the first switch 23 and the second switch 24. The control unit 25 sets a zero-current judgment value and compares the master-phase inductor current with the zero-current judgment value to verify whether the master-phase inductor current has reached the zero-current judgment value and determine whether to modulate the first driving signal to start the master-phase charge time interval. The slave phase correction and control unit 28 sets a zero-current judgment value and compares the slave-phase inductor current with the zero-current judgment value to verify whether the slave-phase inductor current has reached the zero-current judgment value and determine whether to modulate the second driving signal to start the slave-phase charge time interval. The slave phase correction and control unit 28 is electrically coupled to the control unit 25 to obtain the first driving signal, and receives the master-phase charge time interval and the discharging speed of the master-phase inductor current. The slave phase correction and control unit 28 determines the ideal switching timing whereat the slave-phase inductor current descends to the zero-current judgment value according to the discharging speed of the master-phase inductor current. Then, the slave phase correction and control unit 28 calculates the conduction timing error $\Delta T_{on}$ from the ideal switching timing and the physical switching timing whereat the slave-phase charge time interval starts. Further, the slave phase correction and control unit 28 calculates the time length of the slave-phase charge time interval in the same cycle according to the conduction timing error $\Delta T_{on}$ and the master-phase charge time interval.

Figure 6:
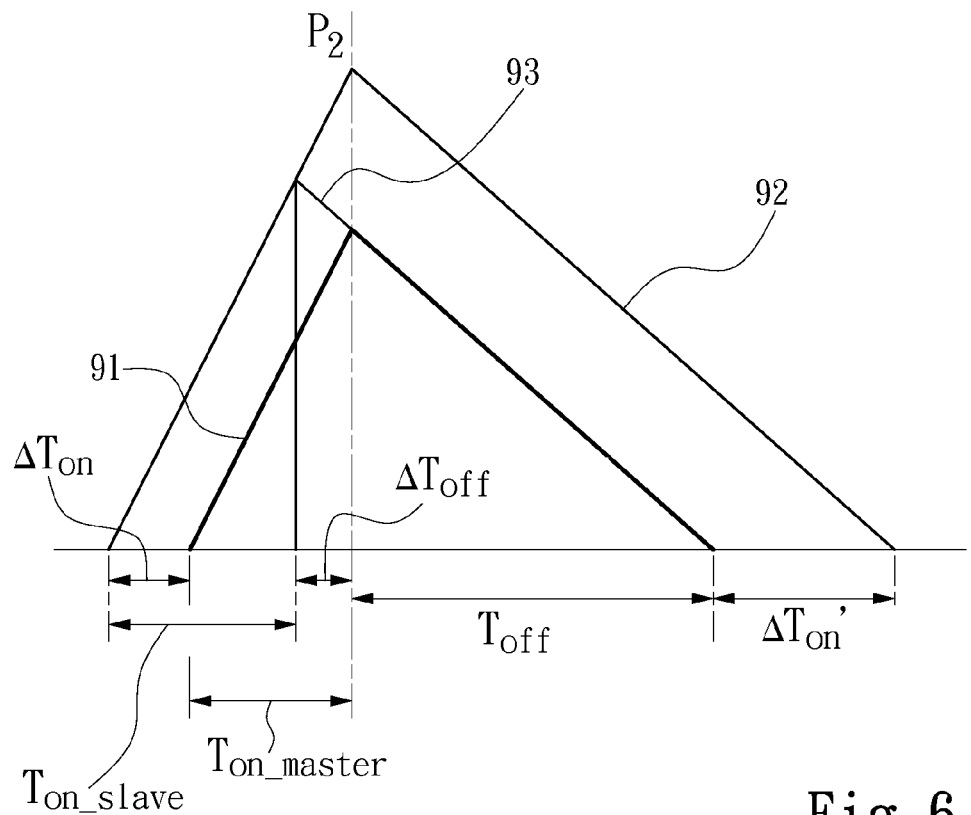
FIG. 6 is a diagram schematically showing the current modulation according to a phase shift control method of the present invention.

The control method described above can be demonstrated mathematically with equations. Refer to FIG. 6 for the related waveforms. In FIG. 6, there are an ideal waveform 91, an uncorrected waveform 92 and a corrected waveform 93 of the slave-phase inductor current. The ideal waveform 91 represents an ideal state that there is none current fluctuation in the circuit and there is none error in the charge timing and the discharge timing of the slave phase. The uncorrected waveform 92 represents a state that there is a conduction timing error $\Delta T_{on}$. As the slave-phase charge time interval is not corrected in the uncorrected waveform 92, there is a disconnection timing error $\Delta T_{off}$ between the uncorrected waveform 92 and the ideal waveform 91. Below is firstly worked out the rising slope $S_r$ and the falling slope $S_f$ of the slave-phase inductor current according to Equations (1) and (2):

$$S_r = U_{in}/L \quad (1)$$

$$S_f = (U_{in} - U_o)/L \quad (2)$$

wherein
$U_{in}$ denotes the RMS value of the input voltage,
$U_o$ denotes the RMS value of the boost converter output voltage, and
L denotes the inductance value of a slave inductor 22.
If we intend to decrease the conduction timing error $\Delta T_{on}'$ of the next cycle, let $$|\Delta T_{on}'/\Delta T_{on}| = U_{in}/(U_o - U_{in}) < 1 \quad (3)$$

Substitute Equation (1) and Equation (2) into Equation (3) and obtain $$U_{in} < 0.5 U_o \quad (4)$$

Figure 1:
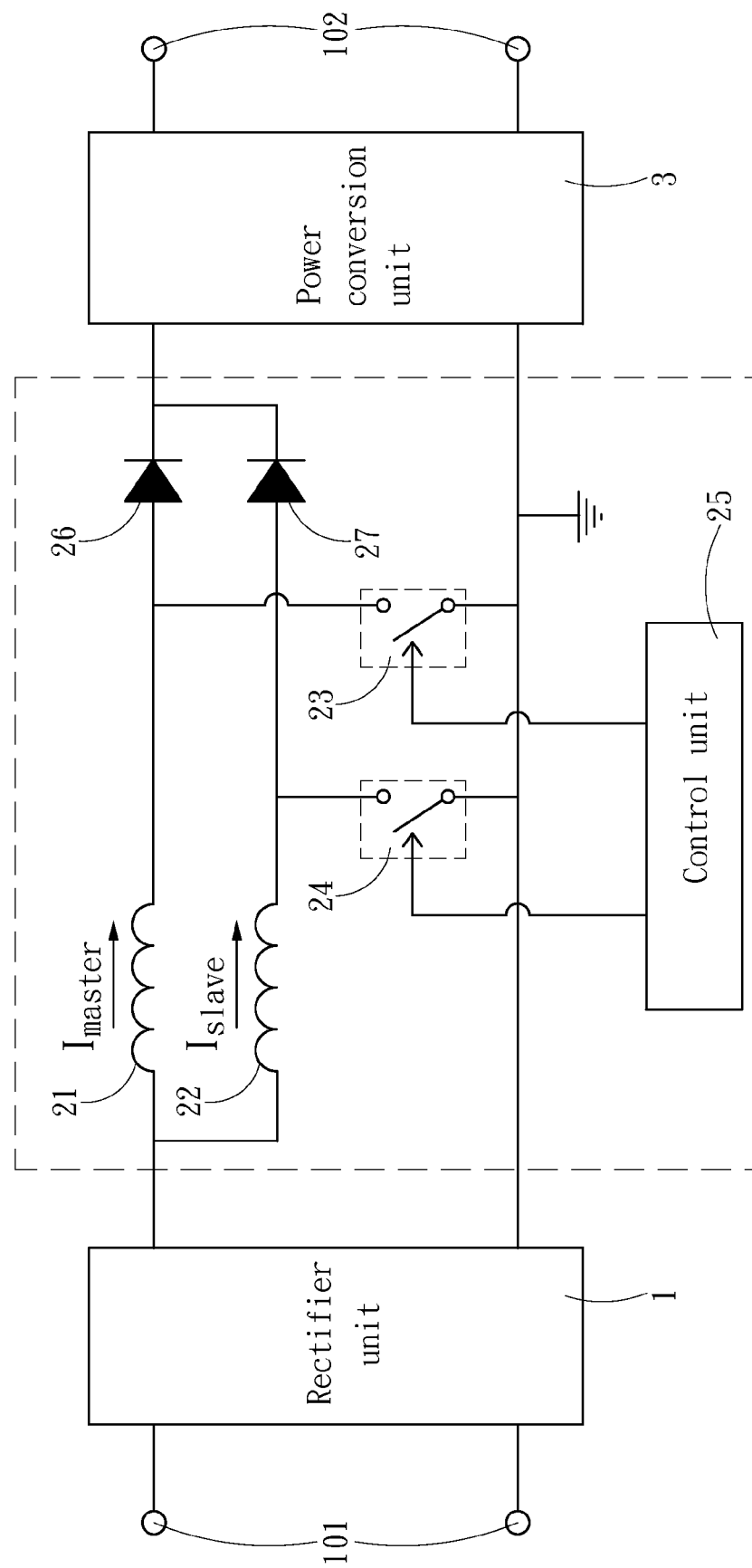
FIG. 1 is a diagram schematically showing the circuit architecture of a conventional paralleled boost converter.
Figure 2:
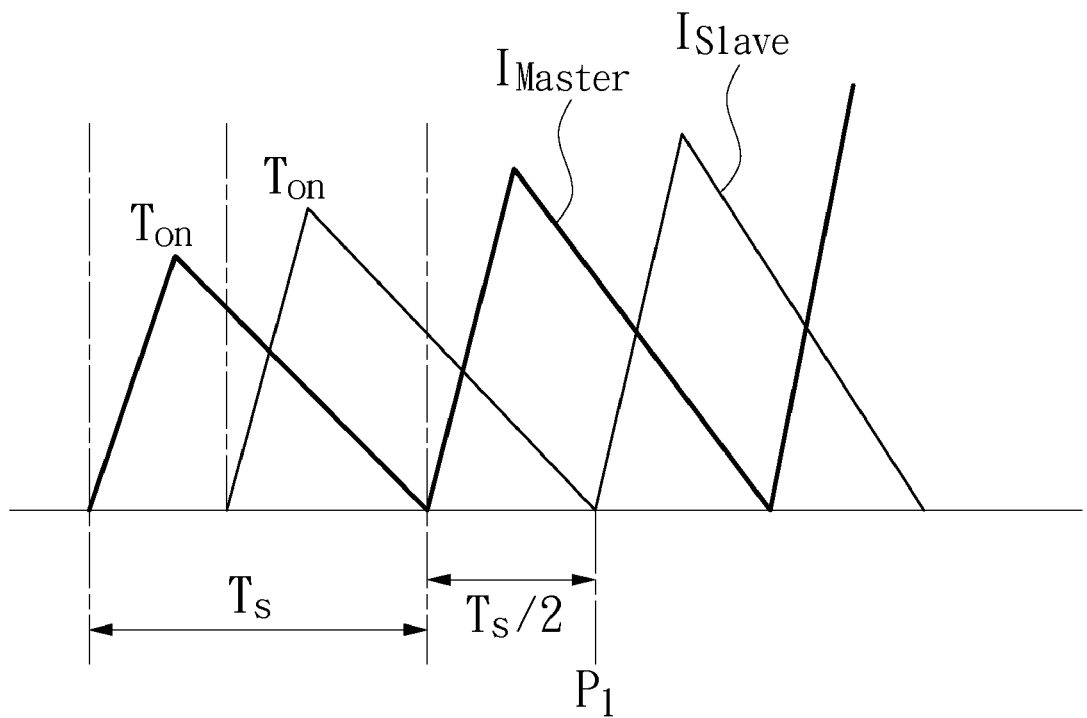
FIG. 2 is a diagram schematically showing the current waveforms of the conventional phase shift conduction method.
Figure 3:
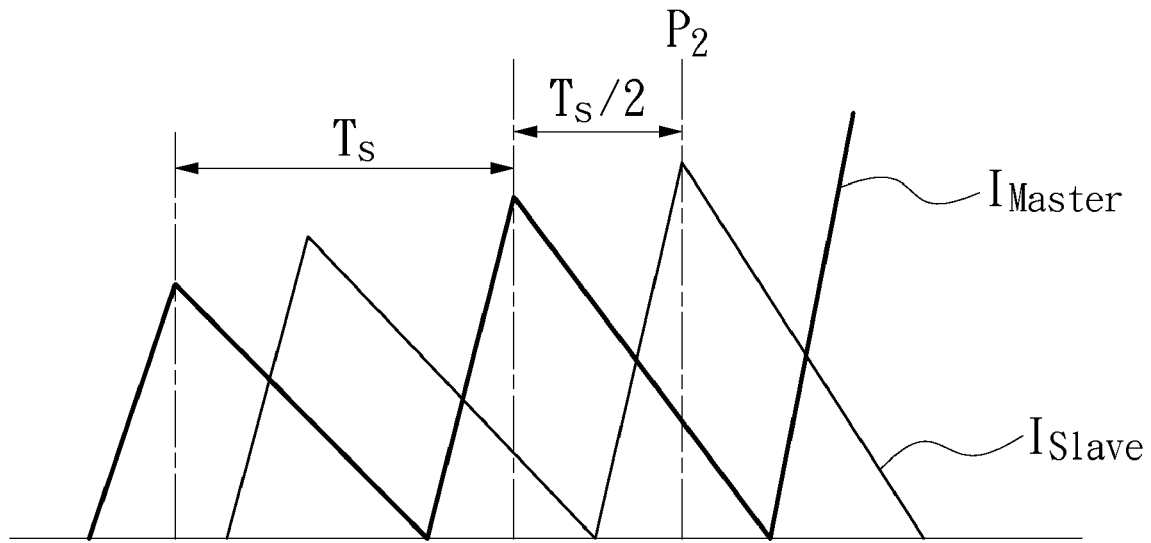
FIG. 3 is a diagram schematically showing the current waveforms of the conventional phase shift disconnection method.
Figure 4:
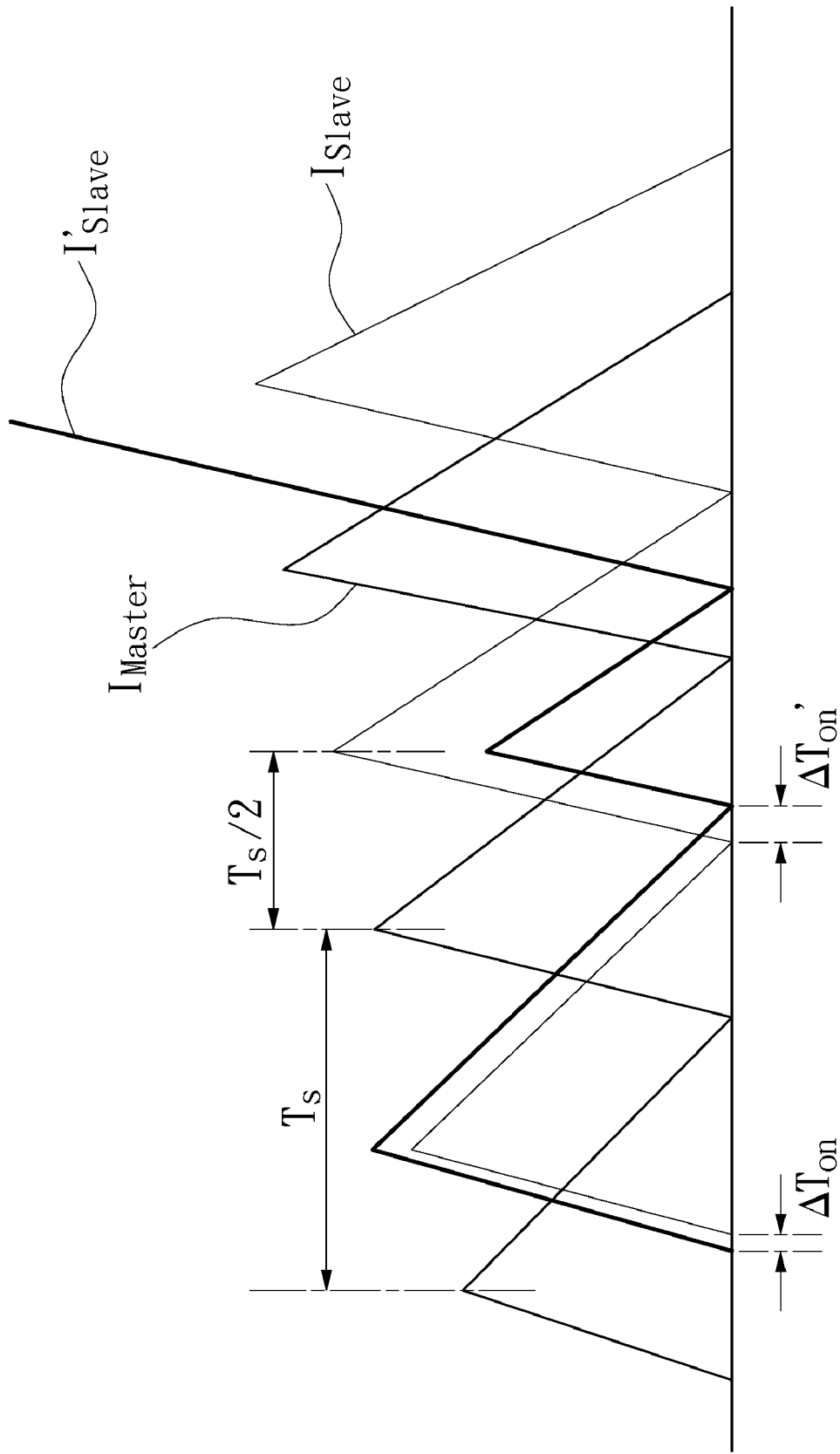
FIG. 4 is a diagram schematically showing the current waveforms of the sub-harmonic oscillation in the conventional phase shift disconnection method.

Equation (4) means that when $U_{in} < 0.5 U_o$, $\Delta T_{on}$ is convergent, and none sub-harmonic oscillation occurs. When $U_{in} > 0.5 U_o$, there is sub-harmonic oscillation occurring, as shown in FIG. 4. In the control method of the present invention, the slave-phase charge time interval is dependent on the conduction timing error $\Delta T_{on}$ and the master-phase charge time interval and expressed by Equation (5)

$$T_{on\_slave} = \Delta T_{on} + T_{on\_master} \quad (5)$$

wherein
$T_{on\_slave}$ denotes the slave-phase charge time interval of the uncorrected waveform 92, and
$T_{on\_master}$ denotes the master-phase charge time interval, and
$\Delta T_{on}$ denotes the conduction timing error.
Substitute Equation (3) into Equation (5) and obtain $$|\Delta T_{on}'| = |\Delta T_{on}| * U_{in}/(U_o - U_{in}) \quad (6)$$

To achieve $\Delta T_{on}' = 0$, $T_{on\_slave}$ must meet the following equations:

$$T_{on\_slave} = T_{on\_master} + \Delta T_{on\_\_} \Delta T_{off} \quad (7)$$
$$= T_{on\_master} + D * \Delta T_{on}$$

wherein $$D = T_{on}/(T_{on} + T_{off})$$

According to Equation (4) and Equation (7), the slave-phase charge time interval can be further expressed by Equation (8):

$$T_{on\_slave} = T_{on\_master} + k * \Delta T_{on} \quad (8)$$

wherein
$T_{on\_slave}$ denotes the slave-phase charge time interval, and
k denotes an error constant, and
$T_{on\_master}$ denotes the master-phase charge time interval.

Figure 7:
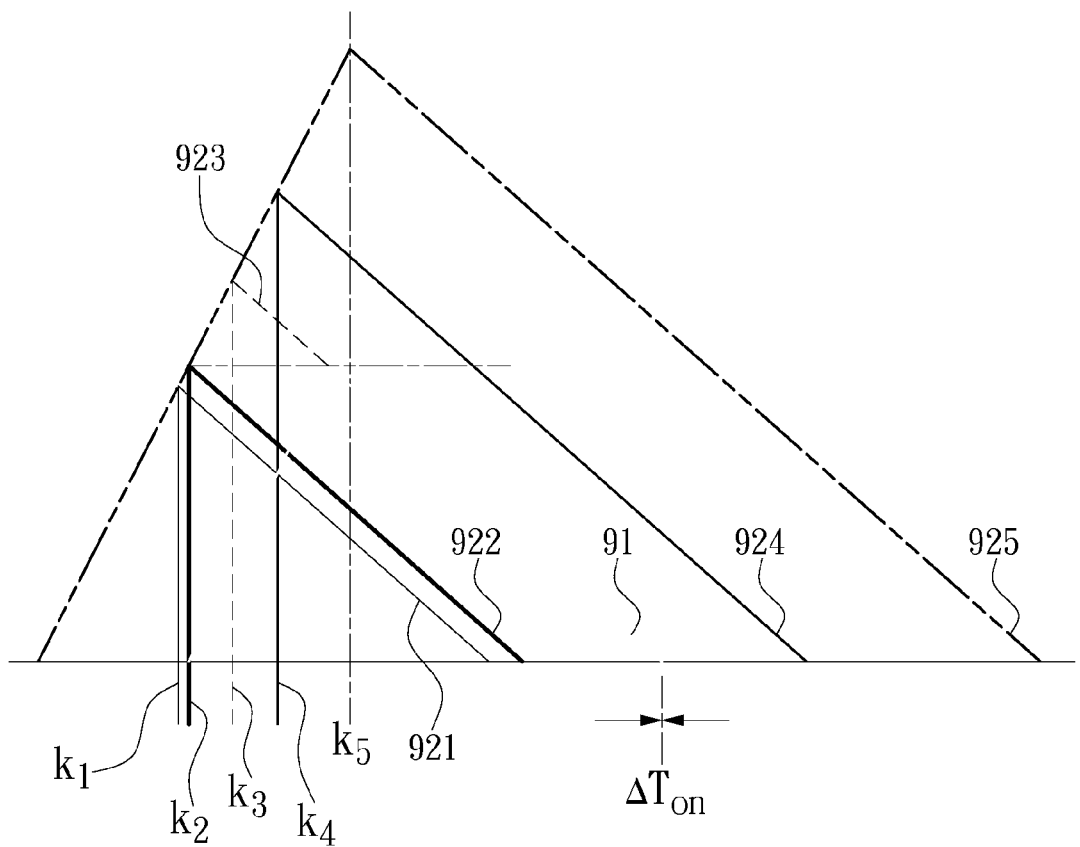
FIG. 7 is a diagram schematically showing the relationship of the error constant and the current modulation according to the present invention.

Refer to FIG. 7 and FIG. 8 for the relationship of the error constant k and the slave-phase charge time interval. FIG. 7 shows an ideal waveform 91, a corrected waveform 921 corresponding to $k_1$ in FIG. 8, a corrected waveform 922 corresponding to $k_2$ in FIG. 8, a corrected waveform 923 corresponding to $k_3$ in FIG. 8, a corrected waveform 924 corresponding to $k_4$ in FIG. 8, and a corrected waveform 925 corresponding to $k_5$ in FIG. 8. From FIG. 7 and FIG. 8, it is known that $|\Delta T_{on}'/\Delta T_{on}| < 1$ when $0 < k < 2D$. In other words, when $0 < k < 2D$, $\Delta T_{on}$ is convergent, and the conduction timing error will decrease in the next cycle. In the present invention, the slave phase correction and control unit 28 may be realized by a PI (Proportional Integral) controller or a PID (Proportional Integral Derivative) controller to achieve the convergence of $\Delta T_{on}$. Thereby, when the slave-phase inductor current fluctuates, the conduction timing error is decreased in the next cycle lest the sub-harmonic oscillation occur. The PI controller and the PID controller are not the features of the present invention but the conventional technologies familiar to the people skilled in the art. Therefore, the technologies thereof will not repeat herein lest the focus of the present invention be confused.

The control method described above can adjust the time length of the slave-phase charge time interval according to the conduction timing error and the master-phase charge time interval. In the present invention, the master-phase charge time interval has a fixed time length. Thus, the time length of the slave-phase charge time interval is adjusted according to the conduction timing error, whereby the conduction timing error will not increase persistently and the current runaway will not occur.

The embodiments described above are only to exemplify the present invention but not to limit the scope of the present invention. Any equivalent modification or variation according to the spirit of the present invention is to be also included within the scope of the present invention.

From the above description, it is known that the present invention has improvements over the conventional control method, and that the present invention possesses novelty and non-obviousness—the conditions for a patent. Thus, the Inventor files the application for a patent. It will be appreciated if the patent is approved fast.

What is claimed is:

1. A phase shift control method for a boost converter, wherein said boost converter comprises a master phase and at least one slave phase paralleled coupled to said master phase; a master-phase inductor current flowing through said master phase has a master-phase charge time interval and a master-phase discharge time interval; a slave-phase inductor current flowing through said slave phase has a slave-phase charge time interval and a slave-phase discharge time interval, and wherein said phase shift control method comprises steps:
   (a) starting said master-phase charge time interval to increase said master-phase inductor current when said master-phase inductor current is determined to have reached a zero-current judgment value;
   (b) starting said master-phase discharge time interval when said master-phase charge time interval is completed; finishing said master-phase discharge time interval to complete a current cycle and starting the next said master-phase charge time interval when said master-phase inductor current is determined to have reached said zero-current judgment value;
   (c) calculating an ideal switching timing whereat said slave-phase inductor current descends to said zero-current judgment value according to a peak value of said slave-phase inductor current in the preceding cycle, and obtaining a physical switching timing in a time point whereat said slave-phase inductor current descends to said zero-current judgment value, and then calculating a conduction timing error between said physical switching timing and said ideal switching timing; and
   (d) determining the time length of said slave-phase charge time interval in the same cycle according to a function of said conduction timing error and said master-phase charge time interval.

2. The phase shift control method for a boost converter according to claim 1, wherein said slave-phase charge time interval is equal to said conduction timing error multiplied by an error constant plus said master-phase charge time interval.

3. The phase shift control method for a boost converter according to claim 1, wherein said master-phase charge time interval is a fixed length of time.

4. The phase shift control method for a boost converter according to claim 1, wherein a circuit implementation said method comprises a first switch unit connected to said master phase, a second switch unit connected to said slave phase, a control unit generating a first driving signal to trigger said first switch unit, and a slave phase correction and control unit generating a second driving signal to trigger said second switch unit, and
   wherein said control unit sets said zero-current judgment value and compares said master-phase inductor current with said zero-current judgment value to verify whether said master-phase inductor current has reached said zero-current judgment value and determine whether to modulate said first driving signal to start said master-phase charge time interval, and wherein said slave phase correction and control unit sets said zero-current judgment value and compares said slave-phase inductor current with said zero-current judgment value to verify whether said slave-phase inductor current has reached said zero-current judgment value and determine whether to modulate said second driving signal to start said slave-phase charge time interval.

5. The phase shift control method for a boost converter according to claim 4, wherein said slave phase correction and control unit determines said ideal switching timing whereat said slave-phase inductor current descends to said zero-current judgment value according to a discharging speed of said master-phase inductor current.

6. The phase shift control method for a boost converter according to claim 5, wherein said slave phase correction and control unit is electrically coupled to said control unit to obtain said first driving signal, and receives said master-phase charge time interval and said discharging speed of said master-phase inductor current.

7. The phase shift control method for a boost converter according to claim 4, wherein said master phase has an inductor and a diode cascaded to said inductor; said first switch unit is connected to between said inductor and said diode, and wherein said slave phase has an inductor and a diode cascaded to said inductor; said second switch unit is connected to between said inductor and said diode.

8. The phase shift control method for a boost converter according to claim 1, wherein said function determining the time length of said slave-phase charge time interval in the same cycle is expressed by $T_{on\_slave} = T_{on\_master} + k*\Delta T_{on}$ wherein $T_{on\_slave}$ denotes said slave-phase charge time interval, and k denotes an error constant, and $T_{on\_master}$ denotes said master-phase charge time interval.

* * * * *